United States Patent [19]

Fuji et al.

[11] Patent Number: 5,359,466
[45] Date of Patent: Oct. 25, 1994

[54] MAGNETIC HEAD DRIVING CIRCUIT WITH IMPEDANCE ELEMENTS TO BALANCE AUXILIARY COIL LOADS

[75] Inventors: Hiroshi Fuji, Nara; Mitsuo Ishii, Yamatokoriyama, both of Japan

[73] Assignee: Sharp Kabushiki Kaisha, Osaka, Japan

[21] Appl. No.: 901,025

[22] Filed: Jun. 19, 1992

[30] Foreign Application Priority Data

Jun. 21, 1991 [JP] Japan .................. 3-150478

[51] Int. Cl.$^5$ .......................... G11B 5/09; G11B 5/02
[52] U.S. Cl. ...................... 360/46; 360/67; 360/68; 360/59
[58] Field of Search ................ 360/46, 55, 59, 60, 360/114, 6, 66, 48, 67, 68

[56] References Cited

FOREIGN PATENT DOCUMENTS 0365891 5/1990 European Pat. Off. .
WO90/05980 11/1989 Fed. Rep. of Germany .
63-94406 4/1988 Japan .
63-094406 9/1988 Japan .
63-244402 2/1989 Japan .
3157839 10/1991 Japan .

Primary Examiner—Donald Hajec
Assistant Examiner—T. N. Forbus, Jr.

[57] ABSTRACT

In a magnetic head driving circuit, switching devices are turned on/off in response to a recording signal, thereby inverting a drive current to be applied from direct current power sources to a magnetic head coil. Switching devices to be switched in connection with on/off of the switching devices are connected in parallel with dummy loads connected to the direct current power sources in series. In response to the switching of the switching devices, the magnetic head coil and the dummy load alternately function as a load of each auxiliary coil. Impedances of the dummy loads are set to be equal to the impedance of the magnetic head coil, thereby making the total load of each of the auxiliary coils fixed at any time. Since a balance can be established between a value of a drive current in one direction and that of a drive current in the opposite direction, it is possible to reduce jitter of a recording mark and enable the drive current to suddenly rise and fall.

18 Claims, 10 Drawing Sheets

0 0 1 0 0 1 0 0 0 0 0 0 1 0 0 1 0 0 0 0 0 0 1 0 0

MAGNETIC HEAD DRIVING CIRCUIT WITH IMPEDANCE ELEMENTS TO BALANCE AUXILIARY COIL LOADS

BACKGROUND OF THE INVENTION

1. Field of the Invention

The present invention relates to magnetic head driving circuits for driving a magnetic head for recording data on a recording medium, and more particularly, to a magnetic head driving circuit capable of over-writing data on a so-called magneto-optical disc.

2. Description of the Background Art

In recent years, a magnetic field modulating system magneto-optical disc apparatus has been proposed. In such a magneto-optical disc apparatus, data is written through irradiation of a recording portion of a magneto-optical disc with a laser beam of a fixed amount and application of magnetic field to the irradiated portion.

FIG. 4 is a block diagram explaining the principle of such magneto-optical disc apparatus. The magneto-optical disc apparatus shown in FIG. 4 comprises a magneto-optical disc 50 having a vertical magnetization film 51, a lens 52 for picking up a laser beam, a magnetic head 53 and a magnetic head driving circuit 54.

Operation for over-writing the magneto-optical disc 50 will be described. The lens 52 narrows down a laser beam and directs the same to the vertical magnetization film 51 of the magneto-optical disc 50. The irradiation of the laser beam causes the temperature of the vertical magnetization film 51 to exceed a Curie point. The magnetic head driving circuit 54 generates a drive current I in response to input data and supplies the current I to the magnetic head 53. The magnetic head 53 generates a magnetic field H in response to the supplied current I. Thus, the generated magnetic field is applied to the portion whose temperature exceeds the Curie point. As a result, a magnetic pattern corresponding to the input data is recorded on the magneto-optical disc 50.

In order to record data on a magneto-optical disc, however, the current technique requires a magnetic field to be generated which is stronger than that required for an ordinary magnetic disc. It is therefore necessary to bring a large current to a high level or down to a low level at a high speed.

A magnetic head circuit for resolving such problem is disclosed in Japanese Patent Laying-Open No. 63-94406.

FIG. 5 is a circuit diagram showing the magnetic head driving circuit described in Japanese Patent Laying-Open No. 63-94406. With reference to FIG. 5, the magnetic head driving circuit comprises a magnetic head coil 1 having an impedance Lx, auxiliary coils 2 and 4, direct current power sources 3 and 5, switching devices 6 and 7, and a data modulator 8 for modulating input data (recording data) on a predetermined system to generate complementary recording signals S1, $\overline{S1}$. The auxiliary coil 2 is connected between a node P which is one end of the magnetic head coil 1, and the direct current power source 3. The auxiliary coil 4 is connected between a node Q which is the other end of the magnetic head coil 1, and the direct current power source 5. Each of the auxiliary coils 2 and 4 have an impedance Ld (Ld>>Lx) larger than the impedance Lx of the magnetic head coil 1.

The switching device 6 is connected between the node P and a ground terminal GND and is turned on/off in response to the recording signal S1. The switching device 7 is connected between the node Q and the ground terminal GND and is turned on/off in response to the recording signal $\overline{S1}$.

FIG. 6 is a diagram showing operation of the magnetic head driving circuit shown in FIG. 5. With reference to FIG. 6, (a) is a waveform diagram of the recording signal S1, (b) a waveform diagram of the recording signal $\overline{S1}$, (c) a waveform diagram of the charging current $I_1$ flowing through the auxiliary coil 2, (d) a waveform diagram of the charging current $I_2$ flowing through the auxiliary coil 4, (e) a waveform diagram of the drive current Ix flowing through the magnetic head coil 1, (f) shows a load impedance of the auxiliary coil 4 and (g) shows a load impedance of the auxiliary coil 2.

With reference to FIGS. 5 and 6, operation of the magnetic head driving circuit shown in FIG. 5 will be described.

First, the data modulator 8 modulates recording data to generate two recording signals S1 and $\overline{S1}$ complementary to each other. The recording signal S1 is applied to the switching device 6, while the recording signal $\overline{S1}$ is applied to the switching device 7. When the switching device 6 is turned on in response to the recording signal S1 (logical high level) and the switching device 7 is turned off in response to the recording signal $\overline{S1}$ (logical low level), the circuit shown by the solid line in FIG. 5 is established wherein the charging current $I_1$ for charging the auxiliary coil 2 flows from the direct current power source 3 to the ground terminal GND through the auxiliary coil 2 and the switching device 6. At this time, the charging current $I_2$ for charging the auxiliary coil 4 flows from the direct current power source 5 to the ground terminal GND through the auxiliary coil 4, the magnetic head coil 1 and the switching device 6. Thus, the magnetic head coil 1 is supplied with the drive current $I_X$ from the node Q toward the node P.

On the other hand, when the signals S1 and $\overline{S1}$ are inverted to turn on the switching device 7 and turn off the switching device 6 as indicated by dotted lines in FIG. 5 (see FIGS. 6 (a) and (b)), the charging current $I_2$ for charging the auxiliary coil 4 flows from the direct current power source 5 to the ground terminal GND through the auxiliary coil 4 and the switching device 7. At this time, the charging current $I_1$ for charging the auxiliary coil 2 flows from the direct current power source 3 to the ground terminal GND through the auxiliary coil 2, the magnetic head coil 1 and the switching device 7. The drive current $I_X$ therefore flows to the magnetic head coil 1 from the node P toward the node Q.

In response to on/off of the switching devices 6 and 7, the load of the auxiliary coil 2 (see FIG. 6 (g)) and the load of the auxiliary coil 4 (see FIG. 6 (f)) attain the impedance Lx of the magnetic head coil or 0.

The relationship between said charging currents $I_1$ and $I_2$ is described in the above-mentioned Japanese Patent Laying-Open No. 63-94406, wherein the inductance of the auxiliary coils 2 and 4 is denoted by La and the inductance of the magnetic head coil 1 by Ln to establish the following equation.

$$I_2 = I_1 \sqrt{\frac{La - Ln}{La + Ln}}$$

Since the relationship of the impedances is expressed as Ld>>Lx, the relationship of La>>Ln is also established, resulting in $I_2 \approx I_1$. As is seen from the above equation, the relationship between $I_1$ and $I_2$ includes no factor of time. As a result, it is possible to increase an inversion rate of a drive current $I_x$ by setting the impedances of the auxiliary coils 2 and 4 to be larger than that of the magnetic head coil 1. In addition, with $Ld>>Lx$, $Lx$ is substantially 0, comparatively so that load fluctuation of the auxiliary coils 2 and 4 is negligible.

However, to increase the frequencies of the recording signals S1 and $\overline{S1}$ in order to increase the data recording rate, the above-mentioned impedance Ld should be as small as possible. As the impedance Ld is decreased, Ld is no longer negligible with respect to Lx. In other words, load fluctuation occurs.

This is followed by imbalance between the charging currents $I_1$ and $I_2$ of the respective auxiliary coils 2 and 4, causing difference as shown in FIGS. 6 (c) and (d). Zero-cross points of the drive current $I_x$ therefore shift and the drive current $I_X$ of the magnetic head coil 1 have different values at a positive level and a negative level, so that jitter of the recording mark is increased to deteriorate the reliability of reproduced data.

The above-described problem becomes particularly conspicuous in the following case. That is, it is a case where a generally known and employed NRZI recording system (Non-return to Zero Inverse) of 2–7 RLL code (2–7 Run Length Limited) is used as a modulation system for recording/reproduction in a magneto-optical disc apparatus. While such system has an advantage of increasing a recording density, it also has a disadvantage that a recording signal in which recording bits are modulated includes a large amount of direct current components. It is therefore impossible to avoid the above-described problem when a recording signal of the above-described system is input to a conventional magnetic head driving circuit.

FIG. 7 shows a bit arrangement of recording data based on the above-described 2–7 RLL code. The 2–7 RLL code includes two to seven "0" between "1" and "1". Modulation of the code by a data modulator of the NRZI system generates recording signals S1 and $\overline{S1}$ including a large amount of direct current components as shown in FIGS. 6 (a) and (b).

FIG. 8 is a circuit diagram of another magnetic head driving circuit disclosed in above-mentioned Japanese Patent Laying-Open No. 63-94406. With reference to FIG. 8, the magnetic head driving circuit comprises a magnetic head coil 15, switching devices 11, 12, 13 and 14, a direct current power source 17 and an auxiliary coil 18. The relationship of the impedances between the auxiliary coil 18 and the magnetic head coil 15 is the same as that of the case shown in FIG. 5. The switching devices 11 and 14 both turn on/off in response to the recording signal S1. The switching devices 12 and 13 both turn on/off in response to the recording signal $\overline{S1}$. The NPN transistor shown in FIG. 9 is used for the switching devices 11–14. Nodes C11 and E11 of FIG. 8 represent a collector and an emitter of the switching device 11 and nodes C13 and E13 represent a collector and an emitter of the switching device 13. The NPN transistor can be replaced by the PNP transistor shown in FIGS. 10 or various devices such as FET (not shown).

FIG. 11 is a diagram illustrating the operation of the magnetic head driving circuit shown in FIG. 8. With reference to FIG. 11, (a) and (b) show waveform diagrams of the signals $\overline{S1}$ and S1. (c), (d), (e) and (f) are waveform diagrams of the voltages of the collector C13, the emitter E13, the collector C11 and the emitter E11, respectively. FIG. 11(g) shows a load impedance of the auxiliary coil 18. The broken lines of (d) and (f) show base voltages of the switching devices 13 and 11.

With reference to FIGS. 8 and 11, operation of the magnetic head driving circuit shown in FIG. 8 will be described. First, recording data is modulated to generate signals S1 and $\overline{S1}$. The switching devices 12 and 13 turn on in response to the signal $\overline{S1}$ (high level), while the switching devices 11 and 14 turn off in response to the signal S1 (low level). Conversely, when the signal $\overline{S1}$ is at a low level and the signal S1 is at a high level, the switching devices 12 and 13 turn off, while the switching devices 11 and 14 turn on.

That is, when the switching devices 12 and 13 turn on (see FIG. 11 (a)) and the switching devices 14 and 11 turn off (see FIG. 11 (b)), for example, as shown in FIG. 8, the charging current of the auxiliary coil 18 flows from the direct current power source 17 to the ground terminal GND through the auxiliary coil 18, the switching device 13, the magnetic head coil 15 and the switching device 12. As a result, the drive current $I_X$ is supplied to the magnetic head coil 15 from the node Q toward the node P.

Conversely, when the switching devices 14 and 11 turn on and the switching devices 12 and 13 turn off, the charging current of the auxiliary coil 18 flows from the direct current power source 17 to the ground terminal GND through the auxiliary coil 18, the switching device 11, the magnetic head coil 15 and the switching device 14. As a result, the drive current $I_X$ is supplied to the magnetic head coil 15 from the node P toward the node Q.

In this related art, the load of the auxiliary coil 18 is fixed (equal to the impedance Lx of the magnetic head coil 15) as shown in FIG. 11 (g), in response to on/off of the switching devices 12 and 13 and the switching devices 14 and 11. The problem of load fluctuation in the magnetic head driving circuit of FIG. 5 is therefore resolved.

In the magnetic head driving circuit in FIG. 8, however, the voltage waveforms of the collectors $C_{13}$ and $C_{11}$ and those of the emitters $E_{13}$ and $E_{11}$ have a large spike-shape because of the current flowing through the auxiliary coil 18 and the magnetic head coil 15 immediately after on or off of the switching devices 12 and 13 and the switching devices 14 and 11.

Since the voltage of the emitter $E_{13}$ and the voltage of the emitter $E_{11}$ become higher than the base voltages (indicated by X in FIG. 11) because of the spike-shaped waveform, the switching device 13 remains off (not shifted to an on state) immediately after the base voltage is inverted from a low level to a high level, and conversely, the switching device 11 remains on (not shifted to an off state) immediately after the base voltage is inverted from a high level to a low level (Y in FIG. 11).

The drive current $I_X$ of the magnetic head is therefore slow to rise and fall. This is because of the circuit structure wherein the switching devices 13 and 11 are placed between the auxiliary coil 18 and the magnetic head 15.

The use of the PNP transistor shown in FIG. 10 as the switching devices 12 and 13 and the switching devices 14 and 11 of FIG. 8 changes the waveforms of FIG. 11 to those shown in FIG. 12. With reference to FIG. 12, $C_{13}$ and $C_{11}$ are voltage waveforms of the collectors of the switching devices 13 and 11, respectively, and $E_{13}$ and $E_{11}$ are voltage waveforms of the emitters of the switching devices 13 and 11, respectively. $B_{13}'$ and $B_{11}'$ are voltage waveforms of the bases of the switching devices 13 and 11, respectively.

Description will now be made of generation of spike noise and delay in switching response in a case where a PNP transistor is used as a switching device.

Similarly to the case of the NPN transistor, the voltage waveforms of the collectors $C_{13}$ and $C_{11}$ and those of the emitters $E_{13}$ and $E_{11}$ have a large spike-shape because of the current flowing through the auxiliary coil 18 and the magnetic head coil 15 immediately after on or off of the switching devices 12 and 13 and the switching devices 14 and 11.

Since the voltage of the collector $C_{13}$ (see FIG. 12 (c)) and the voltage of the emitter $C_{11}$ (see FIG. 12 (e)) become higher than the base voltages because of the spike-shaped waveform, the switching device 11 remains on (not shifted to an off state) immediately after the base voltage $B_{13}'$ attains a high level (see Z in FIG. 12).

Therefore, the drive current $I_X$ of the magnetic head is slow to rise and fall. This is also because of the circuit structure wherein the switching devices 13 and 11 are located between the auxiliary coil 18 and the magnetic head coil 15. Although the description is made of NPN or PNP transistor by way of example of the switching devices 12 and 13 and the switching devices 14 and 11, it is obvious that the same problem occurs even if a switching element of FET or the like is used.

A magnetic head circuit having improved rise and fall characteristics of a drive current to be applied to a magnetic head coil is disclosed in Japanese Patent Laying-Open No. 63-244442.

FIG. 13 is a schematic circuit diagram of the magnetic head driving circuit disclosed in said Patent Laying-Open No. 63-244442. The magnetic head driving circuit shown in FIG. 13 differs from that of FIG. 8 in that a timing generator 19 is provided for generating signals S2, S3, S4 and S5 for controlling on/off timing of the switching devices 11-14 in response to the recording signal S1. The signal S2 is applied to the switching device 12, the signal S3 to the switching device 11, the signal S4 to the switching device 14 and the signal S5 to the switching device 13.

FIG. 14 is an output waveform diagram of each circuit of the magnetic head driving circuit shown in FIG. 13. With reference to FIG. 14, (a) shows a waveform diagram of the recording signal S1, (b) shows that of the signal S2, (c) shows that of the signal S3, (d) shows that of the signal S4, (e) shows that of the signal S5 and (f) shows a waveform of the drive current $I_X$.

Operation of the magnetic head driving circuit shown in FIG. 13 will be described.

When the direction of the drive current Ix is changed to flow from the node Q toward the node P, the signal S5 rises prior to falling of the signals S3 and S4. A time difference between the falling of the signals 3 and 4 and the rising of the signal S5 is represented as $\Delta t_1$.

The switching device 11 and the switching device 14 change from on to off in response to the change of the signal S3 from a high level to a low level and the change of the signal S4 from a high level to a low level, respectively. The switching device 13 is turned on in response to the signal S5 which has risen earlier by a predetermined time $\Delta t_1$ than the falling of said signals S3 and S4.

Conversely, when the drive current Ix is changed to flow from the node P toward the node Q, the signal S3 is brought to high prior to falling of the signals S2 and S5. A time difference between the falling of the signals S2 and S5 and the rising of the signal S3 is represented as $\Delta t_2$. The switching device 11 therefore turns on before the switching devices 13 and 12 turn off.

As a result, a sufficient charging current is supplied to the auxiliary coil. When the switching device is switched, a charge generated by counter electromotive force of the coil causes the drive current to be applied to the magnetic head coil 15 to suddenly rise and fall.

However, increasing the frequency of the recording signal S1 (increasing a data transmission rate) requires the above-described $\Delta t_1$ and $\Delta t_2$ to be considerably small. As a result, the auxiliary coil cannot be fully charged, so that a time required for the drive current for the magnetic head coil to rise and fall cannot be reduced.

The foregoing problems of the related art are summarized in the following (1) to (3).

(1) Values of a current to be applied to the magnetic head coil lose balance between positive and negative. In other words, a gap is generated between a value of the current to be applied to the coil in one direction and that of the current to be applied to the same in the opposite direction. As a result, jitter of the recording mark is increased.

(2) Even if the level of the recording signal (base voltage) is switched, the switch remains off immediately after that, whereby the drive current to be applied to the coil is caused to rise and fall slowly.

(3) Increase of a rate for recording data is followed by a reduction of charging time, resulting in insufficient charging of the auxiliary coil. It is therefore impossible to cause the drive current to be applied to the coil to suddenly rise and fall.

Thus, it is difficult for any of the above described conventional systems to record data of such as 2–7RLL code at a high speed.

SUMMARY OF THE INVENTION

One object of the present invention is to record data at a high speed by providing the same amount of current to a magnetic head coil in one direction and in the opposite direction in a magnetic head driving circuit.

Another object of the present invention is to record data at a high speed in a magnetic head driving circuit while reducing spike noise caused by a direction change of a drive current.

A further object of the present invention is to record data at a high speed in a magnetic head driving circuit without delaying a recording signal.

Briefly stated, the magnetic head driving circuit according to the present invention includes a first auxiliary coil, a second auxiliary coil, a current generator and a path forming circuit.

The first auxiliary coil has an impedance larger than that of the magnetic head coil and is connected to one end of the same.

The second auxiliary coil has an impedance of the same value as that of the first auxiliary coil and is connected to the other end of the magnetic head coil.

The current generator generates first and second currents which alternately drive the magnetic head coil through the first and second auxiliary coils.

The path forming circuit alternately couples the opposite ends of the magnetic head coil to ground to alternately drive the magnetic head coil with the first and second current in opposite directions.

First and second load balancing circuits selectively balance the loads of the first and second auxiliary coils. The first load balancing circuit balances the load of the first auxiliary coil when the magnetic head is driven by the second current. The second load balancing circuit balances the load of the second auxiliary coil when the magnetic head coil is driven by the first current.

Therefore, since a load impedance of each auxiliary coil can be fixed all the time, charging currents of the respective auxiliary coils can be made equal to each other at all times. Thus, it is possible to set a value of a drive current for the magnetic head coil to be equal in one direction to that of a drive current in the opposite direction, so that recording mark with reduced jitter can be recorded.

In addition, with no switch provided between the auxiliary coil and the magnetic head coil, the drive current can be nominally inverted even immediately after the inversion of a recording signal. This allows the drive current to suddenly rise and fall. Furthermore, since the load of the auxiliary coil does not constantly attain 0, power consumption can be reduced.

In addition, with one of the first and second currents being supplied to each auxiliary coil, constant charging of the auxiliary coil is possible, thereby enabling the auxiliary coil to be sufficiently charged. This also enables the drive current of the magnetic head coil to suddenly rise and fall.

The magnetic head driving circuit according to another aspect of the present invention includes a microcomputer. The microcomputer includes a first current generation portion, a second current generation portion and a current switching portion.

The first current generation portion generates a first current.

The second current generation portion generates a second current.

The current switching portion alternately switches between a first state wherein the first and second currents are respectively supplies to first and second auxiliary coils and a second state where the second and first currents are respectively supplied to the first and second auxiliary coils. The switching is done in synchronization with the coupling operation of the path forming circuit such that the currents flowing through the first and second auxiliary coils are substantially the same.

In operation, the microcomputer is equivalent to the current generator and similarly operates to that of the first described circuit according to the present invention.

In addition, the microcomputer enables a magnetic head driving circuit to be made compact, which is a great advantage to the magnetic head driving circuit whose size should be small.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only and thus are not limitative of the present invention and wherein.

DESCRIPTION OF THE PREFERRED EMBODIMENTS

Figure 1:
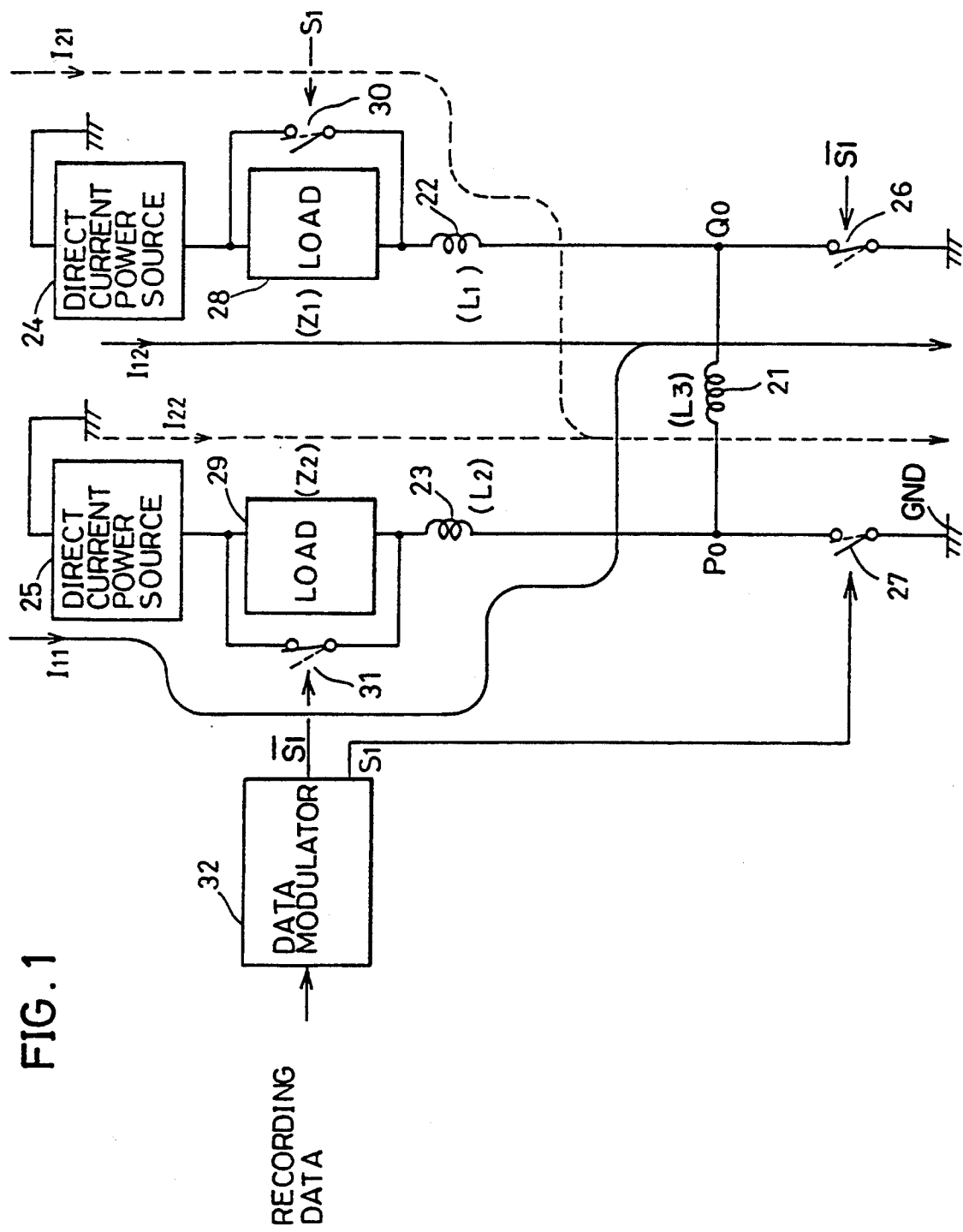
FIG. 1 is a circuit diagram showing one embodiment of a magnetic head driving circuit according to the present invention.

FIG. 1 is a circuit diagram showing one embodiment of a magnetic head driving circuit according to the present invention. With reference to FIG. 1, the magnetic head driving circuit includes direct current power sources 24 and 25, dummy loads 28 and 29, switching devices 30 and 31, auxiliary coils 21 and 23, a magnetic head coil 22 having an equivalent impedance L3, switching devices 26 and 27, and a data modulator 32.

The data modulator 32 modulates data of a predetermined code, 2-7RLL code, for example, based on the NRZI modulation system to generate recording signals S1 and $\overline{S1}$ complementary to each other.

The direct current power source 24 has a negative terminal (not shown) connected to a ground terminal GND and a positive terminal (not shown) connected to one end of the dummy load 28. The dummy load 28 has an impedance Z1 approximately equal to the impedance L3 of the magnetic head coil 21.

The switching device 30 is connected in parallel with the dummy load 28. The other end of the dummy load 28 is connected to one end of the auxiliary coil 22 (equivalent impedance of which is L1), and the other end of the auxiliary coil 22 is connected to one end (node $Q_0$) of the switching device 26. The other end of the switching device 26 is connected to the ground terminal GND.

The direct current power source 25 has a negative terminal (not shown) connected to the ground terminal GND and a positive terminal (not shown) connected to one end of the dummy load 29. The dummy load 29 has an impedance Z2 approximately equal to the impedance of the magnetic head coil 21.

The switching device 31 is connected in parallel with the dummy load 29. The other end of the dummy load 29 is connected to one end of the auxiliary coil 23 (equivalent impedance of which is L2), and the other end of the auxiliary coil 23 is connected to one end (node $P_0$) of the switching device 27. The other end of the switching device 27 is connected to the ground terminal GND.

The magnetic head coil 21 whose equivalent impedance is L3 is connected between the node $Q_0$ between the auxiliary coil 22 and the switching device 26 and the node $P_0$ between the auxiliary coil 23 and the switching device 27.

The auxiliary coils 22 and 23 have impedances larger than the impedance of the magnetic head coil 21, and transmit a drive current to the magnetic head coil 21 and increase an inversion rate of the drive current. Both of the dummy loads 28 and 29 have the same impedances as that of the magnetic head coil 21.

The switching devices 27 and 30 turn on/off in response to the recording signal S1, while the switching devices 26 and 31 turn on/off in response to the recording signal $\overline{S1}$ complementary to the recording signal S1.

More specifically, the switching devices 26, 27, 30 and 31 supply the drive current to the magnetic head coil 21 from one of the direct current power sources 24 and 25 in response to the recording signal. When the switching devices 26 and 31 are on, the switching devices 27 and 30 are off. On the other hand, when the switching devices 27 and 30 are on, the switching devices 26 and 31 are off.

Operation of the magnetic head driving circuit shown in FIG. 1 will be described in the following. The input recording data is modulated by the data modulator 32 and the recording signals S1 and $\overline{S1}$ are generated. The recording signal S1 is applied to the switching devices 27 and 30, while the recording signal $\overline{S1}$ is applied to the switching devices 26 and 31.

In a case where the drive current is applied to the magnetic head coil 21 from the node $P_0$ toward the node $Q_0$ in FIG. 1, for example, the switching devices 26 and 31 and the switching devices 27 and 30 are controlled to be on or off as indicated by the solid line of FIG. 1. At this time, a current $I_{11}$ (flowing from the node $P_0$ toward the node $Q_0$) is applied to the magnetic head coil 21 from the direct current power source 25 through the switching device 31 and the auxiliary coil 23, while a current $I_{12}$ flows to ground from the direct current power source 24 through the load 28, the auxiliary coil 22 and the switching device 26.

Conversely, when the drive current is applied to the magnetic head coil 21 from the node $Q_0$ toward the node $P_0$ in FIG. 1, the switching devices 26 and 31 and the switching devices 27 and 30 are controlled to be on or off as indicated by the dotted line of FIG. 1. At this time, a current $I_{21}$ (flowing from the node $Q_0$ toward the node $P_0$) is applied to the magnetic head coil 21 from the direct current source 24 through the switching device 30 and the auxiliary coil 22, while a current $I_{22}$ flows to ground from the direct current power source 25 through the load 29, the auxiliary coil 23 and the switching device 27.

On/off of the switching devices 26, 27, 30 and 31 is controlled in response to the recording signals S1 and $\overline{S1}$ to switch (invert) the direction of the drive current to be applied to the magnetic head coil 21 in this way. The total amount of the load for each of the auxiliary coils 22 and 23 can be made constant by on/off controlling of the switches 26, 27, 30 and 31 in this way. Description will be given later of a fixed total of the load.

Figures 6, 7:
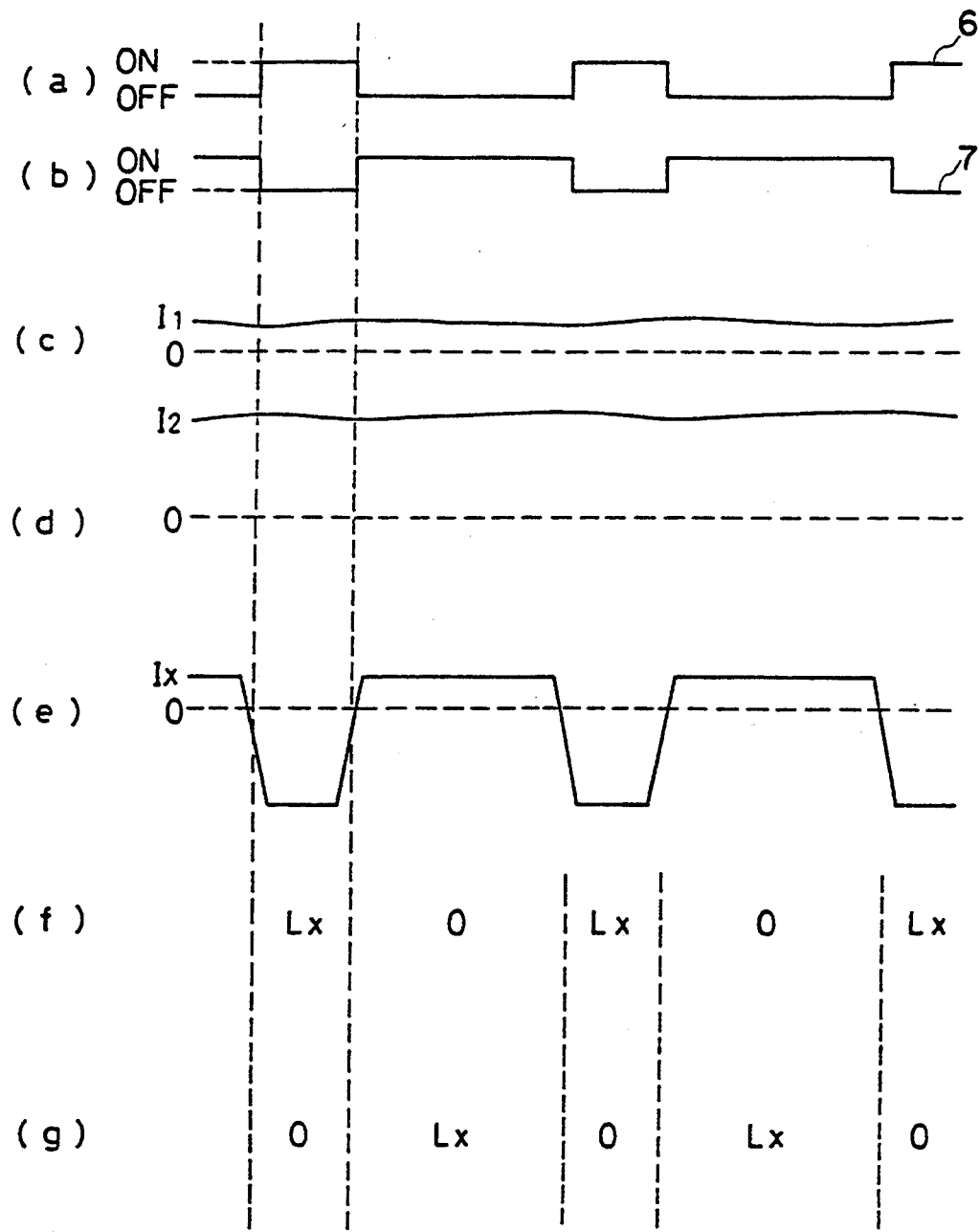
FIG. 6 is a timing chart showing operation of the magnetic head driving circuit shown in FIG. 5.
FIG. 7 is a diagram showing a bit arrangement according to the 2-7 RLL code.
Figure 8:
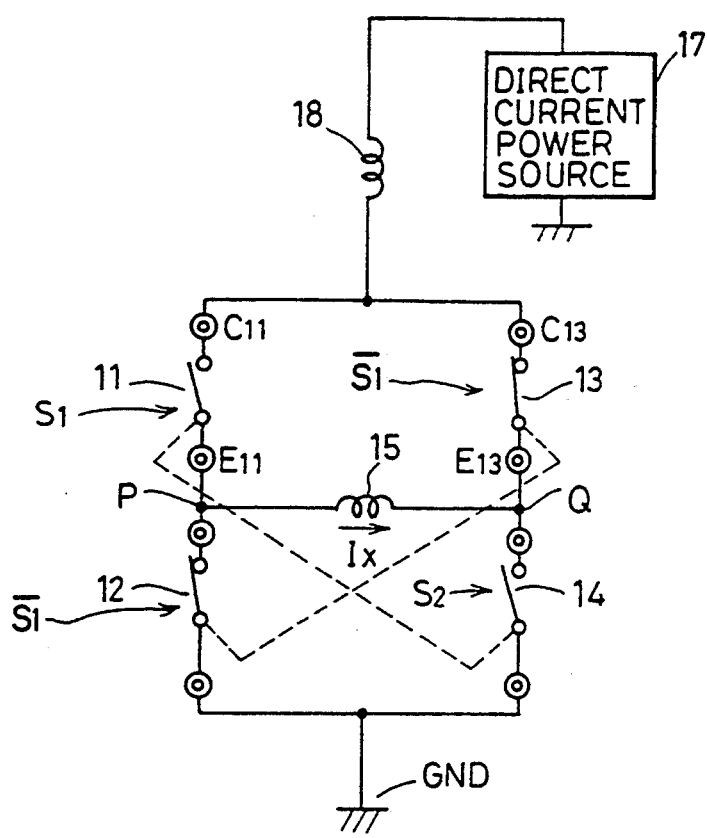
FIG. 8 is a circuit diagram of another conventional magnetic head driving circuit.
Figure 9:
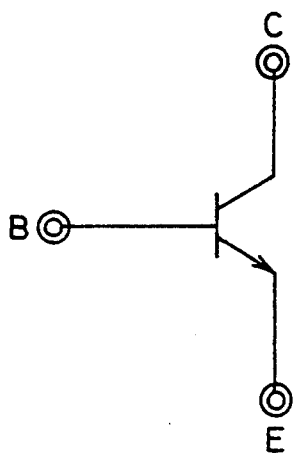
FIG. 9 is a circuit diagram showing one example of a switching device shown in FIG. 8.
Figure 10:
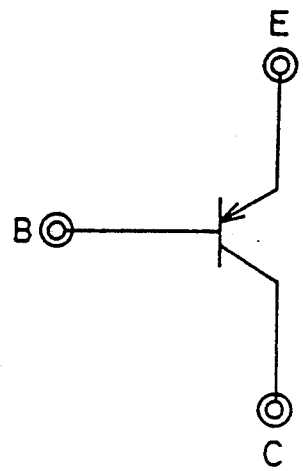
FIG. 10 is a circuit diagram showing another example of the switching device of FIG. 8.
Figure 11:
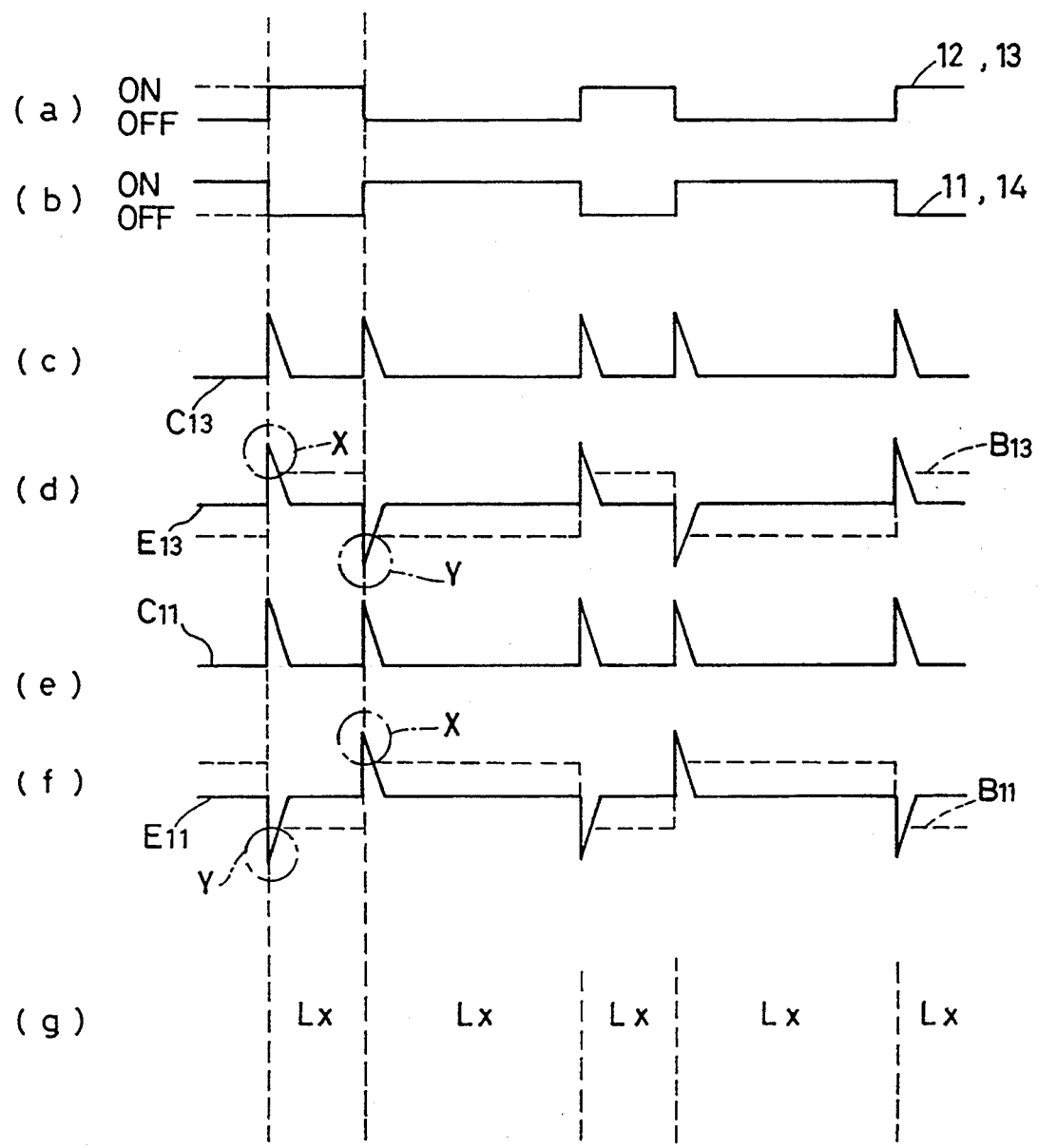
FIG. 11 is a timing chart showing operation of the magnetic head driving circuit shown in FIG. 8.
Figure 12:
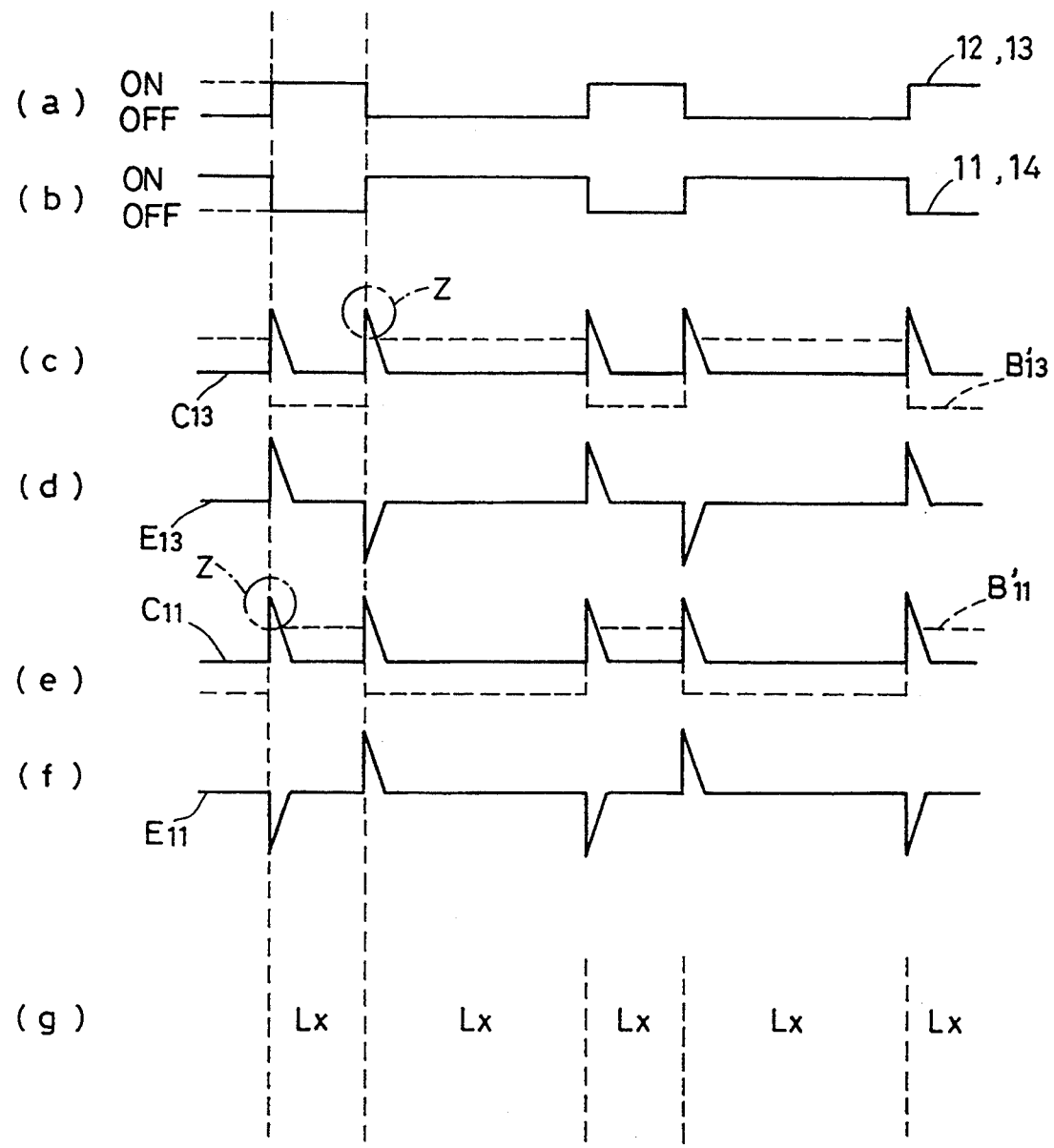
FIG. 12 is a timing chart showing operation of the magnetic head driving circuit in a case where a PNP transistor is used as the switching device in FIG. 8.
Figure 13:
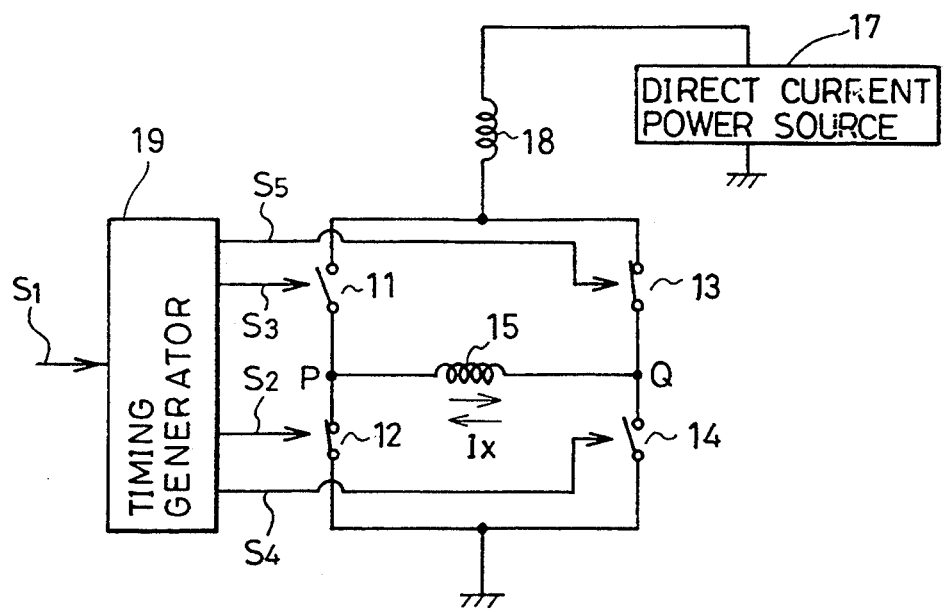
FIG. 13 is a circuit diagram of a conventional magnetic head driving circuit.
Figure 14:
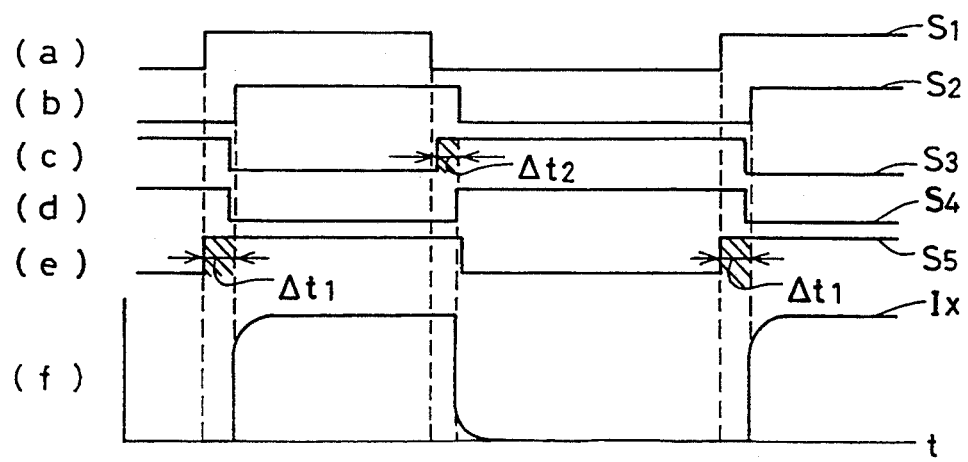
FIG. 14 is an output waveform diagram of each circuit of the magnetic head driving circuit shown in FIG. 13.

Following is description of recording and reproduction of the recording bit array shown in FIG. 2(a) by using the NRZI recording system for the 2–7RLL code shown in FIG. 7 as a recording/reproduction system in a magneto-optical disc apparatus.

Figure 2:
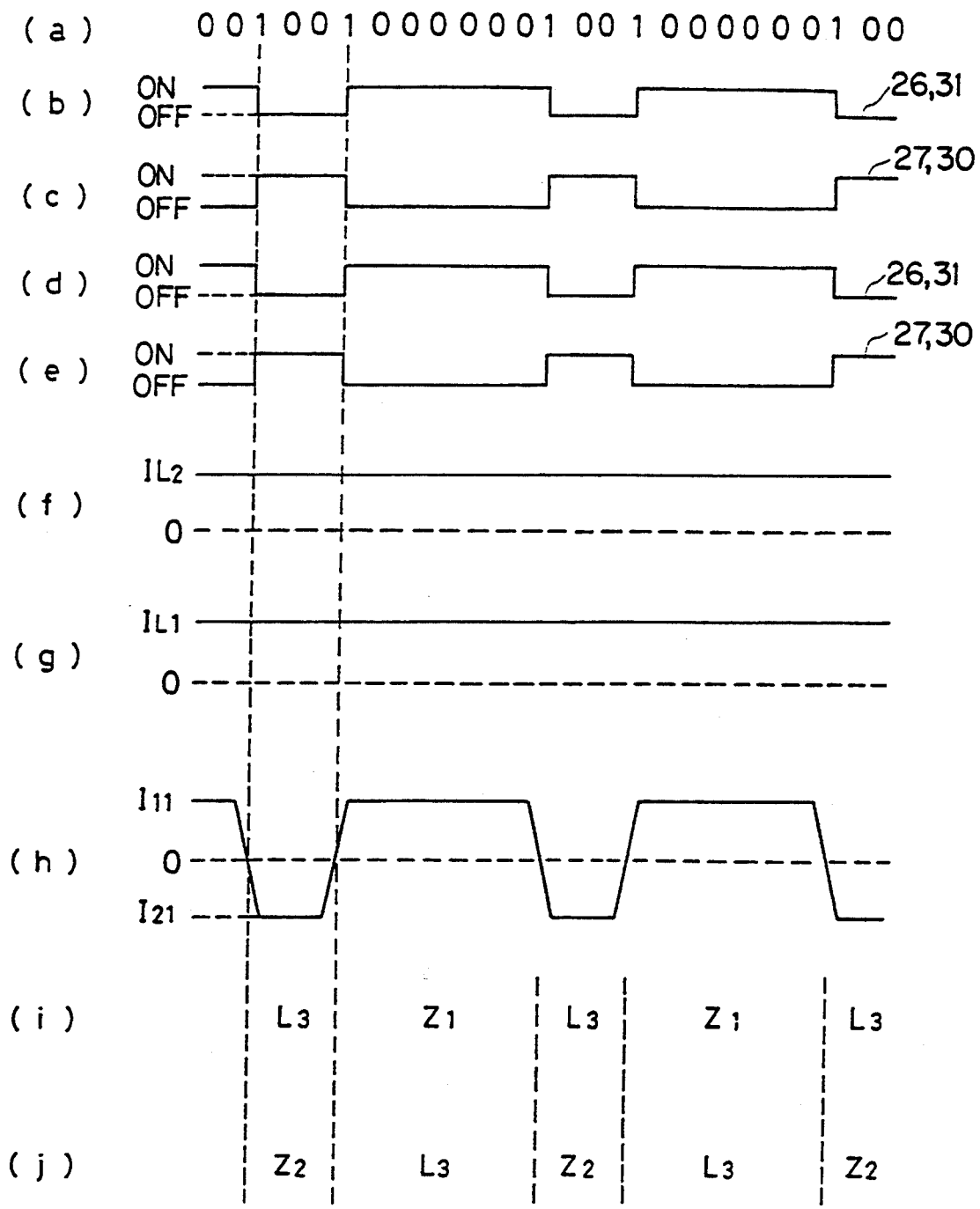
FIG. 2 is a timing chart of a case where data of 2-7RLL code is applied to the magnetic head driving circuit shown in FIG. 1.

FIG. 2 is a timing chart of a case where data of the 2–7RLL code is applied to the magnetic head driving circuit shown in FIG. 1. With reference to FIG. 2, (a) shows a bit arrangement of the 2–7RLL code, (b) and (d) show the states of the recording signal $\overline{S1}$ and the switching devices 26 and 31, (c) and (e) show the states of the recording signal S1 and the switching devices 27 and 30, (f) shows a charging current $I_{L2}$ flowing through the auxiliary coil 22, (g) shows a charging current $I_{L1}$ flowing through the auxiliary coil 23, (h) shows a drive current flowing through the magnetic head coil 21, (i) shows a load impedance of the auxiliary coil 22 and (j) shows a load impedance of the auxiliary coil 23.

Operation for recording data of the 2–7RLL code will be described in the following.

The switching devices 26 and 31 and the switching devices 27 and 30 are turned on/off as indicated by the solid line or the dotted line in FIG. 1 based on the recording bit of FIG. 2 (a).

When the respective switching devices are controlled to be on/off as indicated by the solid line of FIG. 1, the dummy load 28 is the only load for the auxiliary coil 22. The load of the auxiliary coil 22 therefore totals to Z1. When the above-described respective switching devices are controlled to be on/off as indicated by the dotted line of FIG. 1, the magnetic head coil 21 is the only load for the auxiliary coil 22. The load of the auxiliary coil 22 therefore totals to L3. In other words, the load of the auxiliary coil 22 alternately totals to a value of the equivalent impedance Z1 or the equivalent impedance L3 in response to on/off of each switching device (see FIG. 2(i)).

Similarly, when the switching devices 26 and 31 and the switching devices 27 and 30 are controlled to be on/off as indicated by the solid line of FIG. 1, the magnetic head coil 21 is the only load for the auxiliary coil 23. The load of the auxiliary coil 23 therefore totals to L3. When the above-described respective switching devices are controlled to be on/off as indicated by the dotted line of FIG. 1, the dummy load 29 is the only load for the auxiliary coil 23. The load of the auxiliary coil 23 totals to Z2. In other words, the load of the auxiliary coil 23 alternately totals to the equivalent impedance L3 or the equivalent impedance Z2 (see FIG. 2 (j)).

Herein, assuming that both of the dummy loads 28 and 29 have the same impedance as that of the magnetic head coil 21 (ZI=Z2=L3), the total of each load of the auxiliary coils 22 and 23 has a fixed value (L3) at any time even if the switching devices 26 and 31 and the switching devices 27 and 30 are controlled to be on/off as indicated by the solid line or the dotted line of FIG. 1.

In other words, although the recording signal whose recording bit array (see FIG. 2 (a)) is modulated includes a large amount of direct current components, the charging current $I_{L1}$ of the auxiliary coil 22 (see FIG. 2

($g$)) and the charging current $I_{L2}$ of the auxiliary coil 23 (see FIG. 2 ($f$)) are equal to each other at any time. The drive current to be applied to the magnetic head coil 21 therefore has a current value equal in one direction and in the opposite direction as shown in FIG. 2 ($h$)).

In addition, with the switching device 30 arranged between the direct current power source 24 and the auxiliary coil 22 and the switching device 31 arranged between the direct current power source 25 and the auxiliary coil 23, there exists no switch between the auxiliary coil 22 or the auxiliary coil 23 and the magnetic head coil 21. The switching device can be therefore turned on/off normally and reliably even if the level of the recording signal is inverted immediately after the switching operation of the switching device.

Furthermore, since the auxiliary coils 22 and 23 are constantly charged according to on or off control of the switching devices 26 and 31 and the switching devices 27 and 30, the magnetic head coil 21 can be fully charged while reducing power consumption because the load is not 0 all the time.

The dummy loads 28 and 29 may be replaced by a register and the like having the same impedance as that of the magnetic head coil 21. It is obvious that such replacement, if enabling charging currents to the auxiliary coils to be made equal to each other constantly, produces the same effect as described above.

Figure 3:
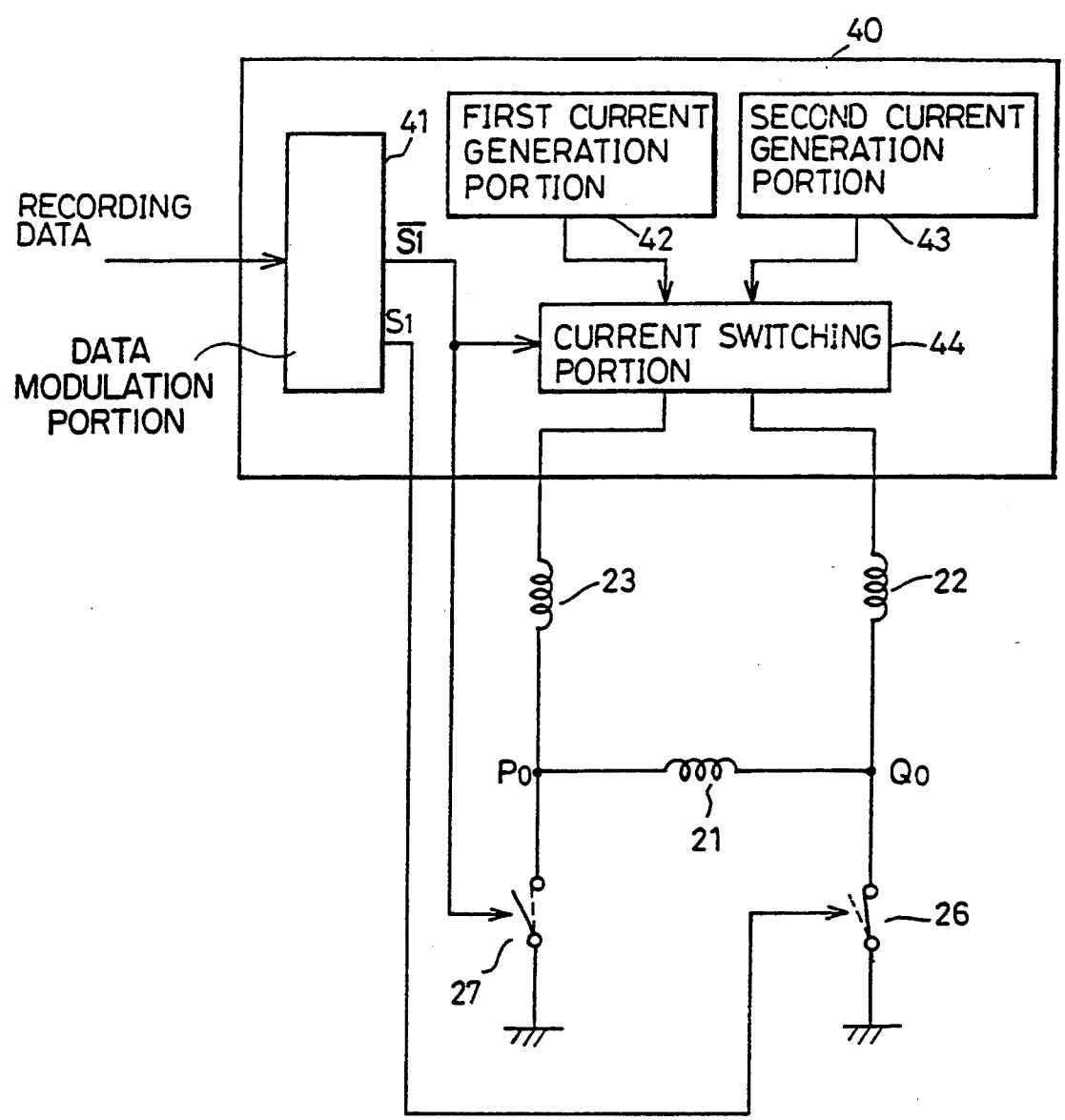
FIG. 3 is a block diagram showing another embodiment of the magnetic head driving circuit according to the present invention.
Figure 4:
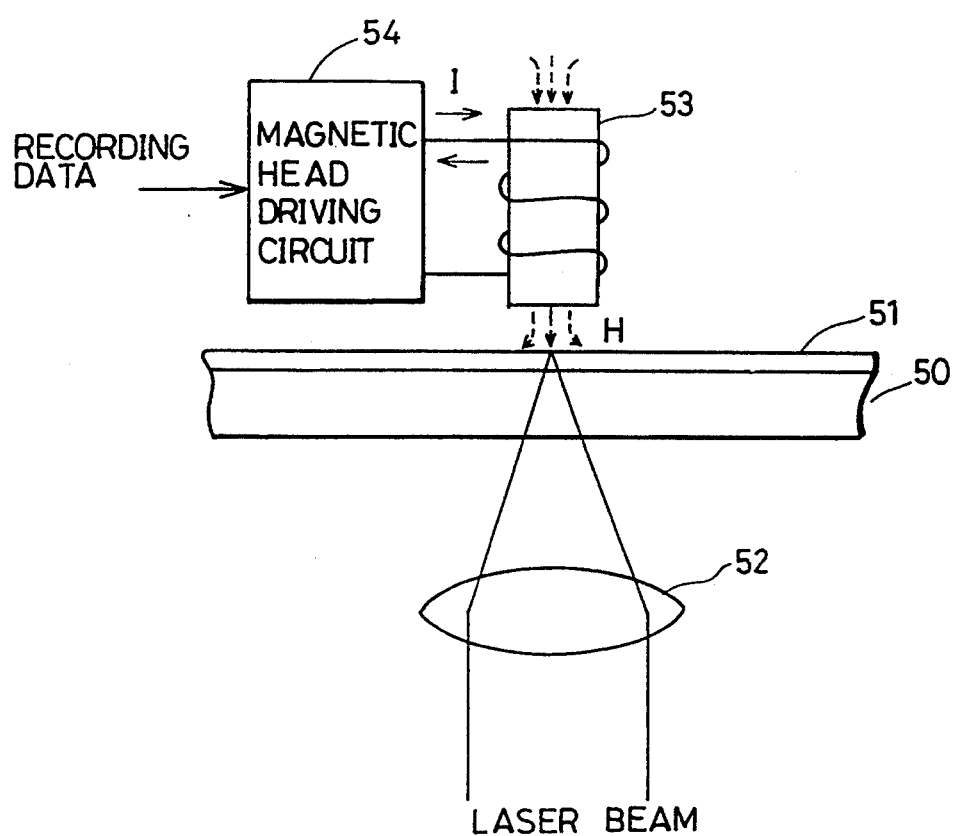
FIG. 4 is a block diagram illustrating the principle of a magneto-optical disc apparatus.
Figure 5:
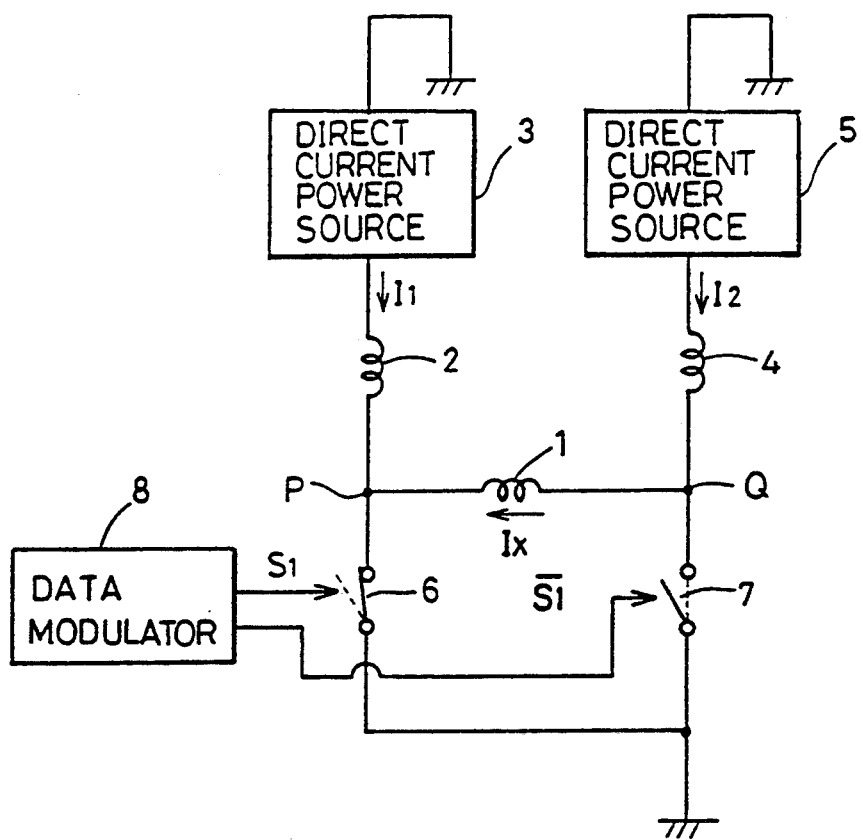
FIG. 5 is a circuit diagram of a conventional magnetic head driving circuit.

FIG. 3 is a block diagram showing another embodiment of the magnetic head driving circuit according to the present invention.

The magnetic head driving circuit shown in FIG. 3 differs from that shown in FIG. 1 in that a microcomputer 40 replaces the data modulator 32, the direct current power sources 24 and 25, the dummy loads 28 and 29 and the switching devices 30 and 31. The microcomputer 40 includes a data modulation portion 41 for modulating data of the 2-7RLL code on the NRZI system, a first current generation portion 42 for generating a drive current for driving the magnetic head coil 21 through one of the auxiliary coils 22 and 23, a second current generation portion 43 for generating a current to be supplied to the other of the auxiliary coils having a current value which is equivalent to a current which has passed through one of the dummy loads 28 or 29 of FIG. 1, and a current switching portion 44 for switching the connection between the first and the second current generation portions 42 and 43 and the auxiliary coils 22 and 23, respectively, in response to a recording signal generated by the data modulation portion 41.

The first current generation portion 42 is equivalent to the direct current power source 25 and the switching device 31 in an on state shown in FIG. 1. The second current generation portion 43 is equivalent to the direct current power source 24 and the dummy load 28 as shown in FIG. 1.

In operation, the data modulation portion 41 modulates the input data of the 2-7RLL code to generate the recording signals S1 and $\overline{S1}$. The current switch portion 44 connects the first current generation portion 42 to the auxiliary coil 23 and the second current generation portion 43 to the auxiliary coil 22 when the recording signal $\overline{S1}$ is at a high level. The recording signals S1 and $\overline{S1}$ are also applied to the switching devices 26 and 27 which are turned on and off, respectively. Thus, a path for flowing the drive current from the node $P_0$ to the node $Q_0$ of the magnetic head coil 21 and a path for supplying a charging current to the auxiliary coil 22 are established.

Conversely, when the recording signal $\overline{S1}$ is at a low level, the current switch portion 44 connects the first current generation portion 42 so the auxiliary coil 22 and the second current generation portion 43 to the auxiliary coil 23. Then, the switching device 26 is turned off and the switching device 27 is turned on. Thus, a path for flowing the drive current from the node $Q_0$ to the node $P_0$, and a path for supplying a charging current to the auxiliary coil 23 are established. As a result, completely the same operation as that of the magnetic head driving circuit of FIG. 1 can be performed.

In addition, the use of the microcomputer 40 enables a magnetic head driving circuit to be made small in scale. This is a great advantage because the magnetic head has a plurality of peripheral components.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A circuit for driving a magnetic head coil comprising:
    a first auxiliary coil having an impedance larger than an impedance of said magnetic head coil and being coupled to a first end of said magnetic head coil;
    a second auxiliary coil having an impedance larger than the impedance of said magnetic head coil and being coupled to a second end of said magnetic head coil;
    current generating means for generating first and second currents which alternately drive said magnetic head coil respectively through said first and second auxiliary coils;
    path forming means, coupled to said magnetic head coil, for alternately coupling the first and second ends of said magnetic head coil to a predetermined potential to alternately drive said magnetic head coil with the first and second currents in opposite first and second directions; and
    first and second load balancing means, coupled between said current generating means and said first and second auxiliary coils respectively, for selectively balancing loads of said first and second auxiliary coils, said first load balancing means balancing the load of said first auxiliary coil when said magnetic head coil is driven by the second current and said second load balancing means balancing the load of said second auxiliary coil when said magnetic head coil is driven by the first current.

2. The circuit of claim 1, wherein said first load balancing means comprises:
    a first dummy load, coupled in series between said current generating means and said first auxiliary coil and having an impedance equivalent to the impedance of said magnetic head coil, for balancing the load of said first auxiliary coil; and
    a first switch, coupled in parallel with said first dummy load, for selectively bypassing the first current to said first auxiliary coil.

3. The circuit of claim 2, wherein said second load balancing means comprises:
    a second dummy load, coupled in series between said current generating means and said second auxiliary coil and having an impedance equivalent to the impedance of said magnetic head coil, for balancing the load of said second auxiliary coil; and a second switch, coupled in parallel with said second dummy load, for selectively bypassing the second current to said second auxiliary coil.

4. The circuit of claim 3, further comprising:

data modulating means, coupled to input data to be recorded, for modulating the input data into control signals which are supplied as timing signals to said path forming means to control the coupling of the first and second ends of said magnetic head coil to the predetermined potential and to said first and second switches to control bypassing of said first and second dummy loads respectively.

5. The circuit of claim 4, wherein the input data comprises strings of logic bits of the same logic value.

6. The circuit of claim 5, wherein the input data comprises 2–7 RLL NRZI encoded data.

7. The circuit of claim 4, wherein said path forming means comprises:

a first switch, coupled between the first end of said magnetic head coil and the predetermined potential, for coupling the first end of said magnetic head coil to the predetermined potential in accordance with the control signals; and a second switch, coupled between the second end of said magnetic head coil and the predetermined potential, for coupling the second end of said magnetic head coil to the predetermined potential in accordance with the control signals.

8. The circuit of claim 1, further comprising:

data modulating means, coupled to input data to be recorded, for modulating the input data into control signals which are supplied as timing signals to said path forming means to control the coupling of the first and second ends of said magnetic head coil to the predetermined potential and to said first and second load balancing means to control balancing of the loads of said first and second auxiliary coils.

9. The circuit of claim 8, wherein the input data comprises strings of logic bits of the same logic value.

10. The circuit of claim 9, wherein the input data comprises 2–7 RLL NRZI encoded data.

11. The circuit of claim 1, wherein the impedances of said first and second auxiliary coils are equivalent.

12. The circuit of claim 1, wherein said current generating means comprises first and second direct current power sources for supplying the first and second currents.

13. The circuit of claim 1, wherein the predetermined potential is ground.

14. A circuit for driving a magnetic head coil comprising:

a first auxiliary coil having an impedance larger than an impedance of said magnetic head coil and being coupled to a first end of said magnetic head coil;

a second auxiliary coil having an impedance larger than the impedance of said magnetic head coil and being coupled to a second end of said magnetic head coil;

path forming means, coupled to said magnetic head coil, for alternately coupling the first and second ends of said magnetic head coil to a predetermined potential; and microcomputer means, coupled to said first and second auxiliary coils, including first current generating means for generating a first current, second current generating means for generating a second current, said first and second current generating means having respective output impedances which differ from each other by an impedance which is equivalent to an impedance of the magnetic head coil, and current switching means for alternately switching between a first state where the first and second currents are respectively supplied to said first and second auxiliary coils and a second state wherein the second and first currents are respectively supplied to said first and second auxiliary coils, in synchronization with coupling operation by said path forming means, such that currents flowing through said first and second auxiliary coils are substantially the same.

15. The circuit of claim 14, wherein said microcomputer means further comprises:

data modulating means, coupled to input data to be recorded, for modulating the input data into control signals which are supplied as timing signals to said path forming means to control the coupling of the first and second ends of said magnetic head coil to the predetermined potential and to said current switch means to control supply of the first and second currents.

16. The circuit of claim 15, wherein the input data comprises strings of logic bits of the same logic value.

17. The circuit of claim 16, wherein the input data comprises 2–7 RLL NRZI encoded data.

18. A circuit for driving a magnetic head coil comprising:

a first auxiliary coil having an impedance larger than an impedance of said magnetic head coil and being coupled to a first end of said magnetic head coil;

a second auxiliary coil having an impedance larger than the impedance of said magnetic head coil and being coupled to a second end of said magnetic head coil;

first current generating means for generating a first current;

second current generating means for generating a second current, said first and second current generating means having respective output impedances which differ from each other by an impedance which is equivalent to the impedance of said magnetic head coil;

path forming means, coupled to said magnetic head coil, for alternately coupling the first and second ends of said magnetic head coil to a predetermined potential; and current switching means for alternately switching between a first state wherein said first and second currents are respectively supplied to said first and second auxiliary coils and a second state wherein said second and first currents are respectively supplied to said first and second auxiliary coils, in synchronization with coupling operation by said path forming means, such that the currents flowing through said first and second auxiliary coils are substantially the same.

* * * * *